(12) United States Patent
Kamiya

(10) Patent No.: US 6,418,280 B2
(45) Date of Patent: Jul. 9, 2002

(54) ELECTROPHOTOGRAPHIC APPARATUS WITH EXPOSURE CONTROL FOR MULTIPLE TARGET LIGHT PORTION POTENTIALS

(75) Inventor: Yuji Kamiya, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/804,155

(22) Filed: Mar. 13, 2001

(30) Foreign Application Priority Data

Mar. 16, 2000 (JP) .......................................... 2000-079313

(51) Int. Cl.$^7$ ............................................... G03G 15/00
(52) U.S. Cl. ............................. 399/46; 347/133; 399/51
(58) Field of Search ............................. 399/46, 48, 50, 399/51, 138; 347/131, 132, 133; 358/300

(56) References Cited

U.S. PATENT DOCUMENTS

| | | | | |
|---|---|---|---|---|
| 4,709,250 A | * | 11/1987 | Takeuchi | 347/131 |
| 4,821,068 A | * | 4/1989 | Honma et al. | 399/51 |
| 5,016,050 A | * | 5/1991 | Roehrs et al. | 399/50 |
| 5,404,203 A | * | 4/1995 | Kinoshita et al. | 399/46 |
| 5,436,697 A | * | 7/1995 | Negishi | 399/46 |
| 5,481,337 A | | 1/1996 | Tsuchiya et al. | 355/208 |
| 5,485,191 A | * | 1/1996 | Gu | 347/131 |

FOREIGN PATENT DOCUMENTS

JP          10-288874      * 10/1988

OTHER PUBLICATIONS

U.S. patent application No. 09/804,264, filed Mar. 31, 2001.

* cited by examiner

Primary Examiner—Joan Pendegrass
(74) Attorney, Agent, or Firm—Fitzpatrick, Cella, Harper & Scinto

(57) ABSTRACT

An electrophotographic apparatus has a detector, for detecting a surface potential on the photosensitive member, a determination unit, for employing the detection results obtained by the detector to determine an electrification amount for the electrification unit and an exposure control value for the exposure unit, for determining the electrification amount for the electrification unit, so that a dark portion potential on the photosensitive member is substantially a target dark portion potential selected from multiple target dark portion potentials, for determining a first exposure control value for the exposure unit, so that a light portion potential, which is based on the determined electrification amount and which is formed on the photosensitive member by the electrification unit and the exposure unit, is substantially a first target light portion potential, and for determining, in accordance with the first exposure control value and the selected target dark portion potential, a second exposure control value for the exposure unit, so that a light portion potential on the electrostatic image is substantially a second target light portion potential.

11 Claims, 10 Drawing Sheets

ELECTROPHOTOGRAPHIC APPARATUS WITH EXPOSURE CONTROL FOR MULTIPLE TARGET LIGHT PORTION POTENTIALS

BACKGROUND OF THE INVENTION

1. Field of the Invention

The present invention relates to an electrophotographic apparatus for controlling the surface potential of a photosensitive member, and in particular relates to an electrophotographic apparatus that can select one of multiple target potentials as the surface potential for a photosensitive member.

2. Related Background Art

A widely employed technique for setting a desired dark portion potential and a desired light portion potential for an eloectrophotographic photosensitive member, involves the use of detection means, called a potential sensor, for measuring dark portion potential and light portion potential.

Whenever it is necessary to form a stable dark portion potential and a stable light portion potential, the potential control is initiated either at the time of or after a predetermined time has elapsed following the activation of an image forming apparatus, before the first output or after a predetermined time has elapsed following it, or upon the receipt of an artificial execution command.

As a popular sequence for obtaining a desired dark portion potential and a desired light portion potential, since the exposure amount of the exposure means is substantially "0", first, the charge amount of the electrification means is adjusted so as to set a desired dark portion potential, and then, the exposure amount (quantity) of the exposure means is determined by using the charge amount (quantity) whereat the dark portion potential was obtained.

The relationship between the exposure amount of the photosensitive member used for electrophotography and the surface potential thereof seldom is a linear relationship to the exposure amount, and generally, the inclination is reduced when the exposure amount is large. In this case, even when the exposure amount is changed, a change of the dark portion potential can not be precisely read, and the measurement error is increased.

As a countermeasure for this phenomenon, two types of light portion potentials are employed. To obtain the first light portion potential, an exposure amount E1 is adjusted in a region wherein the inclination of the potential to the exposure amount is comparatively large, and either a specific value is added to the exposure amount or the exposure amount is multiplied by a specific rate, so that the final desired light portion potential is obtained as the second light portion potential. Thus, an image forming apparatus is generally employed that uses the second light portion potential to output an image. That is, the first light portion potential is detected by a sensor for the potential adjustment, and the second light portion potential is used to actually form an image.

However, according to the conventional potential control method using the two light portion potentials, when an image forming apparatus employing multiple dark portion potentials has (stores) only one value to be added to the first exposure amount, or only one ratio relative to the first exposure amount, the second light portion potential, that is, the final light portion potential, is greatly changed.

For various reasons, multiple different dark portion potentials are employed to change the dark portion potential, e.g., because of an image forming difference between a copy image and a printer image, because of a reduction in the amount of toner consumed, because of the need to prevent the leakage of electrification means in a low atmosphere, because of the need to adjust an image density, or because of development characteristics due to an environment.

Since even each dark portion potential has several types or a great number of levels, there could be several tens to an infinite number of combinations including the dark portion potential and the light portion potential that corresponds to the individual conditions.

On the other hand, in order to constantly obtain the same light portion potential, several tens to an infinite number of combinations must be stored for either the rate relative to the first exposure amount or the value to be added to the exposure amount. Thus, a load for the preparation for the process sequence or a load for a hard configuration, such as a memory, becomes very large.

SUMMARY OF THE INVENTION

It is one objective of the present invention to provide an electrophotographic apparatus that can appropriately determine the potential of a photosensitive member.

It is another objective of the present invention to provide an electrophotographic apparatus that can appropriately determine a light portion potential, regardless of the different dark potentials that may have been set for a photosensitive member.

It is an additional objective of the present invention to provide an electrophotographic apparatus that can determine many light portion potentials that correspond to different dark portion potentials on a photosensitive member.

DETAILED DESCRIPTION OF THE PREFERRED EMBODIMENTS (First Embodiment)

Figure 1:
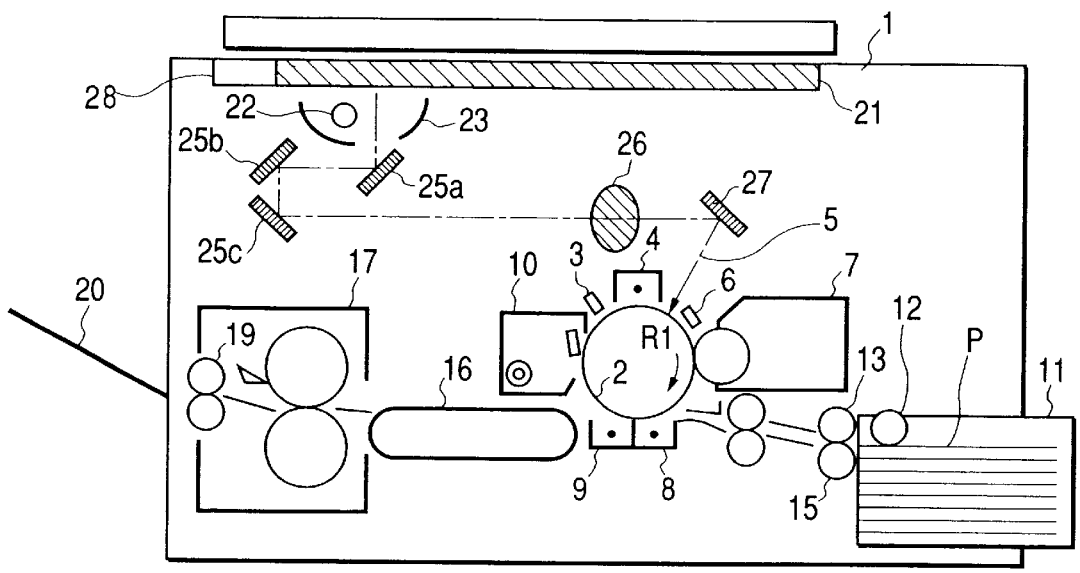
FIG. 1 is a schematic diagram showing a copier according to a first embodiment of the present invention.

FIG. 1 is a schematic diagram showing as a copier an image forming apparatus according to a first embodiment of the present invention.

In the copier, substantially in the center of a main body 1, a cylindrical photosensitive drum 2 is provided as an electrophotographic photosensitive member. The photosensitive drum 2 is supported by the main body 1 so that it can be rotated in the direction indicated by an arrow R1. Provided around the photosensitive member 2 in the rotational direction are a charge elimination unit 3, such as a pre-exposure lamp, for eliminating the potential on the photosensitive drum 2; a primary electrification device 4, as electrification means for uniformly electrifying the surface of the photosensitive drum 2; exposure means 5 for exposing the surface of the photosensitive drum 2 and forming an electrostatic latent image; a potential sensor 6, for measuring the surface potential of the photosensitive drum 2 after exposure; a developing device 7, as developing means for attaching toner to the electrostatic latent image and forming a toner image; a transfer electrification device 8, for transferring the toner image to a transferring material P; a separation electrification device 9, for separating the transferring material P from the photosensitive drum 2; and a cleaner 10, for removing residual toner from the photosensitive drum 2. The transfer material P, to which the toner image is to be transferred, is supplied from a paper deck 11. This paper deck 11, for stacking the transfer materials P, is located below the photosensitive member 2, i.e., in the lower portion of the main body 1.

The transfer material P in the paper deck 11 is supplied by a feed roller 12, and is fed via a carry roller 13 and a resist roller 15 to a gap between the photosensitive drum 2 and the transfer electrification device 8. The transfer material P is then transported along a carry belt 16 to a fixing unit 17. The toner image is fixed to the transfer material P by heat and pressure exerted by the fixing unit 17, and the transfer material P, bearing a final copy image, is discharged by discharge rollers 19 to a discharge tray 20.

In this copier, an original document, placed on a platen glass 21, is irradiated by an original lighting lamp 22 and a reflection plate 23. The light reflected from the original image is further reflected by mirrors 25a, 25b and 25c, and is passed through a magnification lens 26 and guided, via a projection mirror 27, to the surface of the photosensitive drum 2. Thus, this light is used to expose the surface of the photosensitive drum 2, which is uniformly electrified, and to form an electrostatic latent image corresponding to the original image.

In order to adjust the exposure amount (quantity) of the photosensitive drum 2, a standard white board 28 is located at the end of the platen glass 21, and the original lighting lamp 22 irradiates the white board 28 to form a light portion potential on the photosensitive drum 2.

Figure 2:
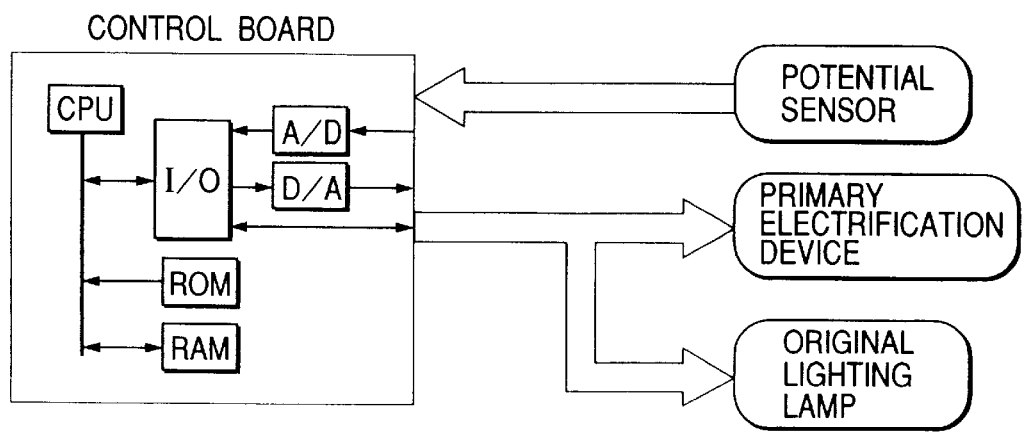
FIG. 2 is a diagram for explaining the electric arrangement in the vicinity of a control board according to the first embodiment.

FIG. 2 is a schematic diagram for explaining the electric arrangement in the vicinity of the control board and determining how it affects the measurement of the potential on the photosensitive drum 2.

In FIG. 2, a ROM, in which a control program is stored, and a RAM, which is a temporary storage device for storing data required for the program, are connected to a CPU, which is the central processing device. Further, an I/O, which is an interface device, and an A/D converter and a D/A converter, which are data conversion devices, are connected to external periphery devices, and information is input to or output by the control board. As a peripheral device for this embodiment, a potential sensor is provided that can measure the potential on the photosensitive drum 2 after it has been electrified and exposed. Further, the application voltages for the primary electrification device 4 and the original lighting lamp 22 are controlled in order to form a desired dark portion and light portion potentials on the photosensitive drum 2.

Figure 3A:
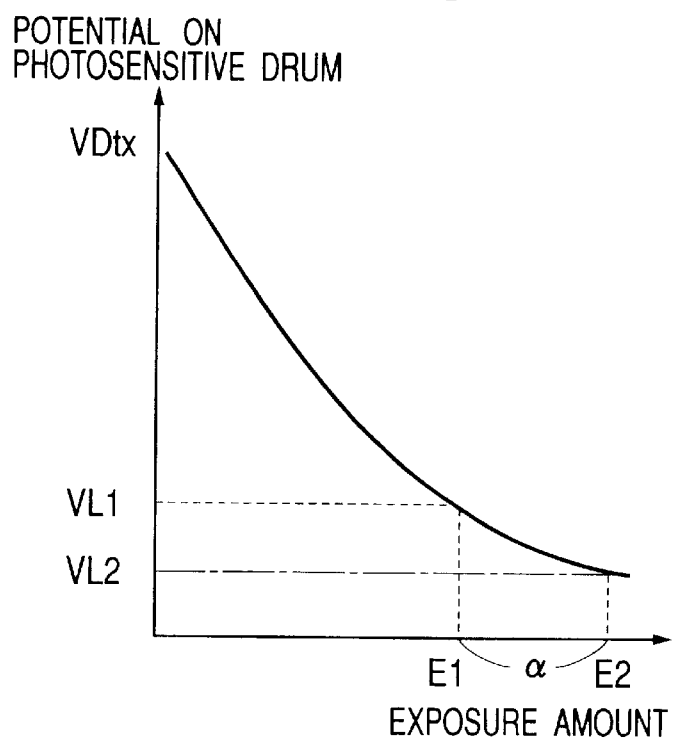
FIGS. 3A and 3B are graphs for explaining the ratio of an exposure amount according to the first embodiment.
Figure 3B:
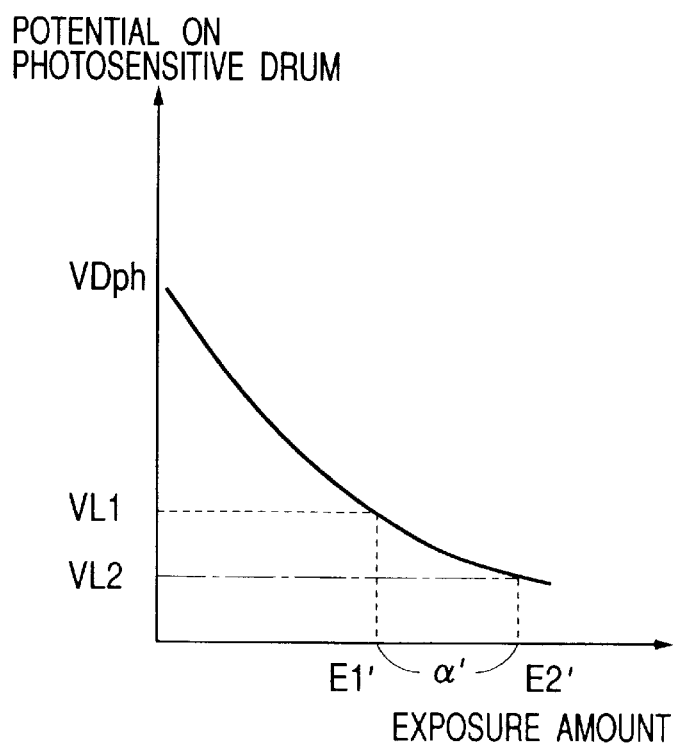

FIGS. 3A and 3B are graphs for explaining the exposure amount used to obtain a first equal light portion potential VL1 and a second equal light portion potential VL2 for two different dark portion potentials.

In FIG. 3A, for the dark portion potential of 400 V (=VDtx), the first light portion potential VL1, of 100 V, is obtained at the first exposure amount E1, and the second light portion potential VL2, of 50 V, is obtained at the second exposure amount E2.

In FIG. 3B, for the 300 V (=VDph) dark portion potential the 100 V first light portion potential VL1 is obtained at the first exposure amount E1', and the 50 V second light portion potential VL2 is obtained at the second exposure amount E2'.

The dark portion potential VDtx, in FIG. 3A, is a condition applied for a character mode of the image forming apparatus for an original document that mainly includes characters. The dark portion potential VDph, in FIG. 3B, is a condition applied for a photo mode for an original document that mainly includes photos. When a user manipulates the console panel (not shown) of the image forming apparatus to select an appropriate mode for the original document, at the same time, the target dark portion potential VD (VDtx or VDph) is set. In other words, multiple target dark portion potentials, VDtx and VDph, can be set.

When the difference between the exposure amounts E1 and E2 is defined as $\alpha$ and the difference between the exposure amounts E1' and E2' is defined as $\alpha'$, in the potential control in the character mode in FIG. 3A, the exposure amount E1 need only be adjusted and the obtained amount increased by a part equivalent to $\alpha$. In the potential control for the photo mode in FIG. 3B, the exposure amount E1' need only be adjusted and be obtained amount increased by a part equivalent to $\alpha'$. This is true because, as is described above, the inclination of the potential is small near E2 and E2' and it is difficult to directly adjust the exposure amounts E2 and E2', thus, the exposure amounts E1 and E1' must be obtained first and then $\alpha$ and $\alpha'$ must be added thereto.

However, as is apparent from the graphs, $\alpha$ is not equal to $\alpha'$. The exposure amount of the original lighting lamp 22 of this embodiment is determined by application of the voltage, and the differences $\alpha$ and $\alpha'$ for the exposure amounts are 7 V and 5 V, obtained through the conversion of the voltage applied to the original lighting lamp.

That is, the two voltage differences must be stored in accordance with the mode. A problem arises in a case wherein the toner reduction mode, for reducing the target dark portion potential VD, is added to the character mode and the photo mode. In order to reduce the toner, the target dark portion potential VD is simply reduced by 50 V, and then four target VDs are set: 400 V (character/standard mode), 350 V (character/toner reduction mode), 300 V (photo/standard mode), and 250 V (photo/toner reduction mode). In the toner reduction mode, when the dark portion potential is to be reduced multiple levels, the number of VDs that must be set in order to store the difference in the exposure amount is twice the count of the multiple levels. In this embodiment, the above four target dark portion potentials are included.

Figure 4A:
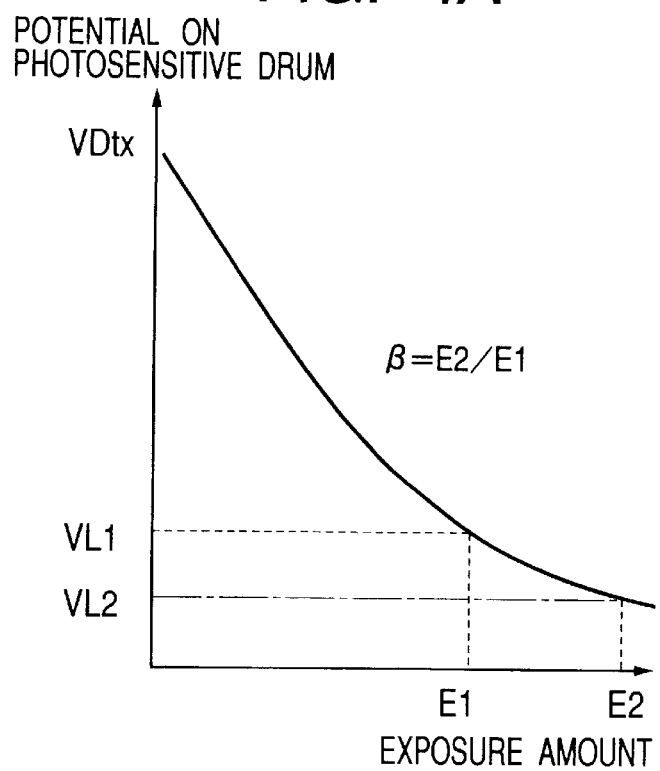
FIGS. 4A and 4B are graphs for explaining the ratio of an exposure amount according to the first embodiment.
Figure 4B:
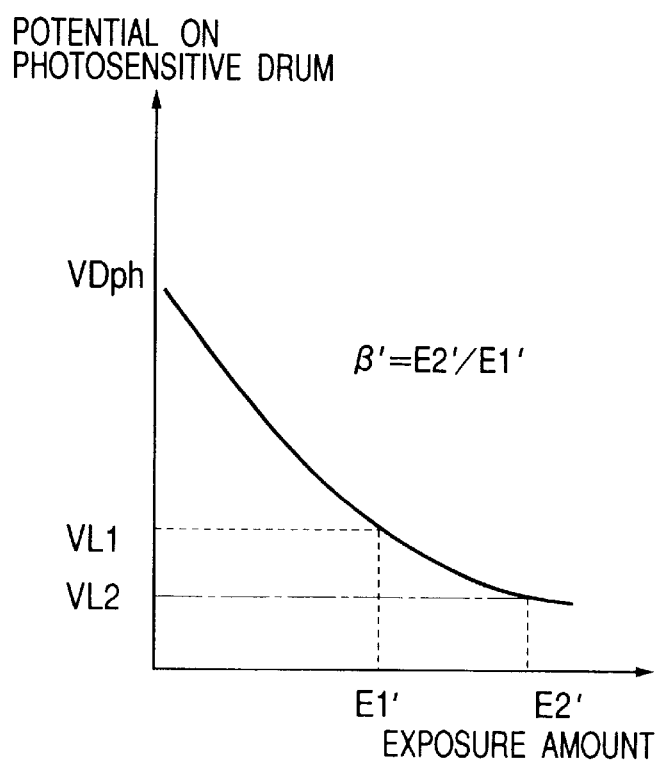

In FIGS. 4A and 4B, instead of using the differences in the exposure amount, the ratio β of E2 and E1 and the ratio β' of E2' and E1' are calculated. In this case also, the ratio β is not equal to the ratio β'.

Therefore, the present inventor formed the dark portion potentials VD on the photosensitive drum, and adjusted the voltage P1 of the original lighting lamp, which obtains the first exposure amount E1, to obtain the first light portion potential VL1. Further, the present inventor closely examined the voltage P2 of the original lighting lamp, which obtains the second exposure amount E2, to obtain the second light portion potential. Because of the potential characteristic of the photosensitive member, a large measurement error occurs when the potential adjustment mechanism of the image forming apparatus is used, and it is difficult to measure the voltage P2 within a short period of time. Thus, for an examination of the voltage P2 of the original lighting lamp that obtains E2, an experiment was conducted that yielded a higher precision by using an external potential measurement system and increasing the number of measurements.

An original difficulty encountered was that it was difficult for only the potential adjustment mechanism, which obtains the voltage P2, to obtain the second light portion potential VL2. Thus, as a first condition, the potential control that was required was provided by using two exposure amounts E1 nd E2, as in this invention, i.e., the two applied voltages P1 and P2.

Figure 5:
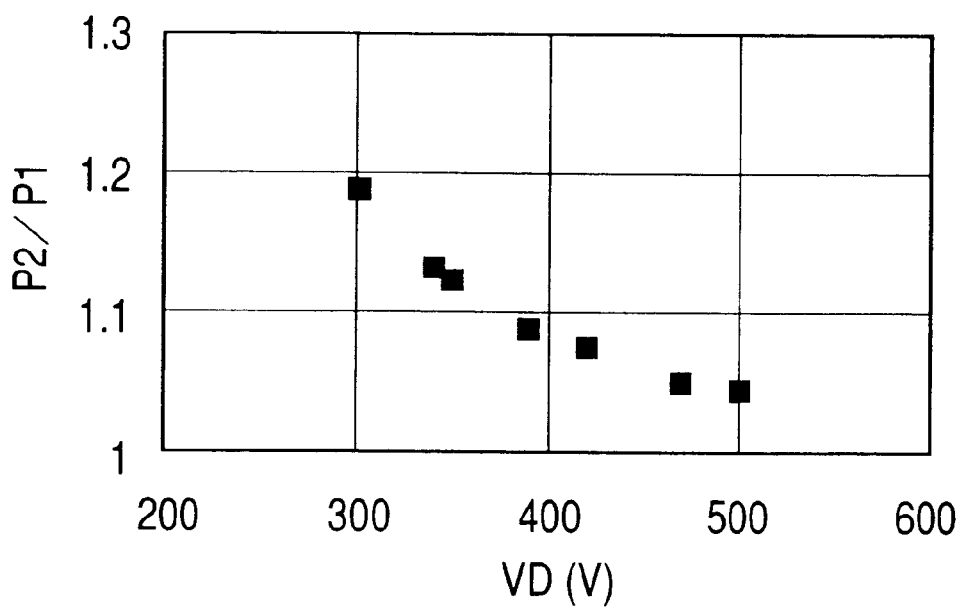
FIG. 5 is a graph of a ratio P2/P1 plotted relative to a dark portion potential VD according to the first embodiment.

FIG. 5 is a graph showing the experiment results plotted relative to the dark portion potential VD, i.e., showing the ratio P2/P1 between the voltage P2 of the original lighting lamp used to obtain the second exposure amount E2 and the voltage P1 used to obtain the first exposure amount E1. In the graph, the ratio P2/P1 changes monotonously; it is not linear, but curved.

Figure 6:
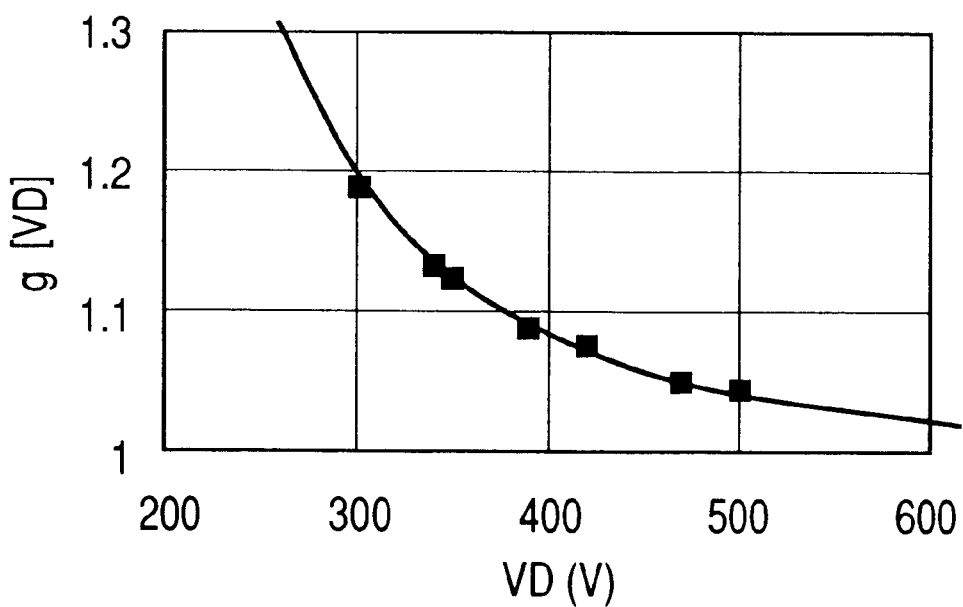
FIG. 6 is a graph for explaining a hyperbola using the dark portion potential according to the first embodiment.

When an approximation of the curve was prepared from the plots, as is shown in FIG. 6, the plots were located substantially along the approximate curve.

When several functions were provided for the dark portion potential VD, a hyperbola was matched the most. In this embodiment, the second voltage P2 is calculated using the following expression.

$$P2 \equiv P1 \cdot g[VD] \quad \text{first expression}$$

where $g[VD]=5408662/((VD)^3-50^3)+1$, and $VD>50$.

Figure 7:
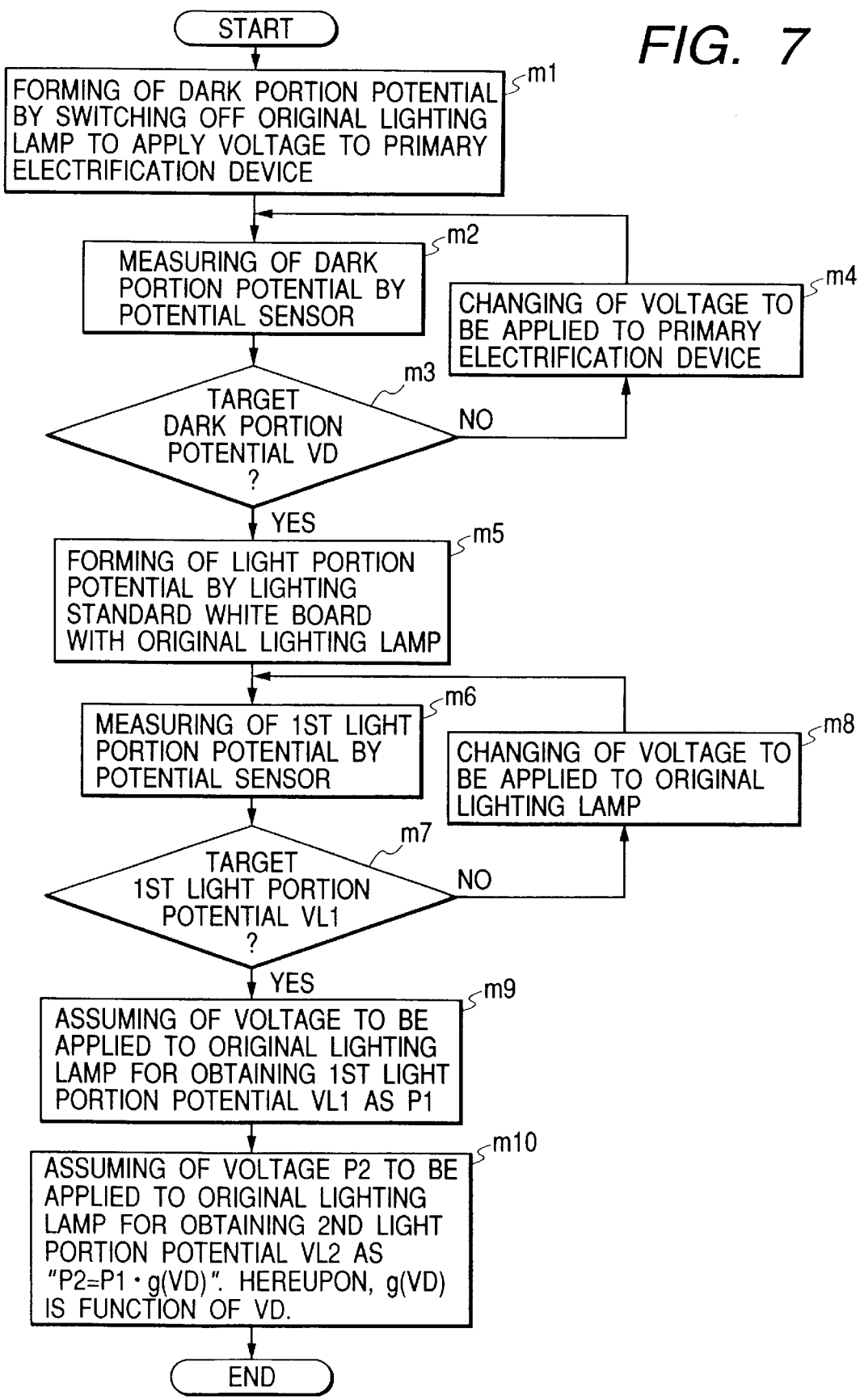
FIG. 7 is a flowchart for the potential control according to the first embodiment.

FIG. 7 is a flowchart for the potential control provided for this embodiment.

First, to form the initial dark portion potential (m1), the original lighting lamp 22 is turned off and a predetermined voltage is applied to the primary electrification device 4. The initial applied voltage may be either a predetermined value or a previously adjusted voltage value. This dark portion potential is measured by the potential sensor 6, which is distant from the primary electrification device 4 and is located downstream of the photosensitive drum 2 (m2), and whether the target dark portion potential VD has been attained is determined (m3). When the potential does not fall within the range represented by VD±3 V, the voltage that constitutes the electrification control value applied to the primary electrification device 4 is controlled (m4) so that the dark portion potential matches to the target dark portion potential VD.

The photosensitive drum 2 is electrified by applying the voltage for the primary electrification device 4 that is determined through the above sequence, and the original lighting lamp 22 is used to irradiate the standard white board 28 to form the first light portion potential on the photosensitive drum 2 (m5). The voltage applied to the original lighting lamp 22 may be either a predetermined value or a value applied at a previous control time. To ascertain whether the target light portion potential VL1 shown in FIG. 3 has been attained (m7), the light portion potential is measured by the potential sensor 6 (m6). When the light portion potential does not fall within the range represented by VL1±3 V, the voltage applied to the original lighting lamp 22, which is the exposure control value, is changed (m8), and the exposure amount is adjusted so that the light portion potential is reset to the target portion potential VL1. The first voltage thus adjusted is defined as P1 (m9). In this embodiment, the second applied voltage P2, which is the exposure control value for image forming, is calculated using the first expression (m10). The second applied voltage P2 is a voltage to be applied to the original lighting lamp 22 for the copying of the actual original document.

As is apparent from the first expression, the second voltage P2 is provided as the function of the dark portion potential VD. When the dark portion potential for image forming is formed by the application of the voltage P2, regardless of the dark portion potential VD, the stable light portion potential VL2 can be obtained, and the obtained image can be stabilized.

Table 1 shows a comparison between the conventional examples and the embodiment of this invention.

TABLE 1

|  | Conventional example 1 | Conventional example 2 | Conventional example 3 | Conventional example 4 | Embodiment of the invention |
|---|---|---|---|---|---|
| Method | E2 = E1 + α when the exposure amount difference α is fixed, i.e., P2 = P1 + A when the applied voltage difference A is fixed. | E2 = E1 · β when the exposure amount ratio β is fixed, i.e., P2 = P1 · B when the applied voltage ratio B is fixed. | E2 = E1 + α when the number of exposure amount differences α that are stored is equivalent to the count of the VDs that are set, i.e., P2 = P1 + A when the number of applied voltage differences A that are stored is equivalent to the count of | E2 = E1 · β when the number of exposure amount ratios β that are stored is equivalent to the count of the VDs that are set, i.e., P2 = P1 · B when the number of applied voltage ratios B that are stored is equivalent | P2 is represented by the functions P1 and VD. |

TABLE 1-continued

| | Conventional example 1 | Conventional example 2 | Conventional example 3 | Conventional example 4 | Embodiment of the invention |
|---|---|---|---|---|---|
| | | | the VDs that are set. | to the count of VDs that are set. | |
| Advantages | Simple calculation | Simple calculation | Possible to cope with different VDs. | Possible to cope with different VDs. | Possible to cope with different VDs. |
| Disadvantages | Impossible to cope with different VDs. | Impossible to cope with different VDs. | Must store as a number of As equivalent to the count of the VDs that are set. | Must store the number of Bs equivalent to the count of VDs that are set. | None |

In this table, for example, conventional example 1 employs a method for fixing the exposure amount difference α in FIG. 3, i.e., for fixing the difference (A) between the voltages applied to the original lighting lamp 22. This simple configuration can not cope with different dark portion potentials VD. Conventional example 2 also employs the method for fixing the exposure amount ratio β in FIG. 4, i.e., for fixing the ratio (B) of the voltages applied to the original lighting lamp 22. This simple configuration also can not cope with different dark portion potentials VD. Conventional example 3, as does conventional example 1, employs a method for storing a number of exposure amount differences α that is the equivalent of the count of the different VDs, i.e., for storing the number of differences (A) between voltages applied to the original lighting lamp 22 that is equivalent in count to the VDs that are set. As VDs are set at multiple levels, the number of differences between the voltages A that correspond to α is increased, so that the configuration is complicated and costs are is increased. Conventional example 4, as does conventional example 2, employs a method for storing a number of exposure amount ratios β that is equivalent to the count of different VDs, i.e., for storing a number of the ratios (B) of voltages applied to the original lighting lamp 22 that is equivalent to the count of VDs that are set. The disadvantages of conventional example 4 are the same as for conventional example 3. However, in this embodiment, since the second applied voltage P2 is calculated using the function of the first applied voltage P1 and VD, this method can cope with different dark portion potential VDs that are set. Further, since the structural and cost problems as in conventional examples 3 and 4 do not arise, the stable light portion potential VL2 is obtained and a stable image can be formed.

(Second Embodiment)

An explanation for a second embodiment will now be given while concentrating mainly on those portions that differ from the first embodiment.

In the first embodiment, employed for the analog exposure copier is a calculation method whereby the voltage P2 applied to the original lighting lamp 22, to obtain the second light portion potential used for actual image forming, is calculated by employing the product of the function of the dark portion potential and the voltage P1, applied to the original lighting lamp 22 for obtaining the first light portion potential used for adjustment. In this embodiment, a digital exposure printer will now be described.

Figure 8:
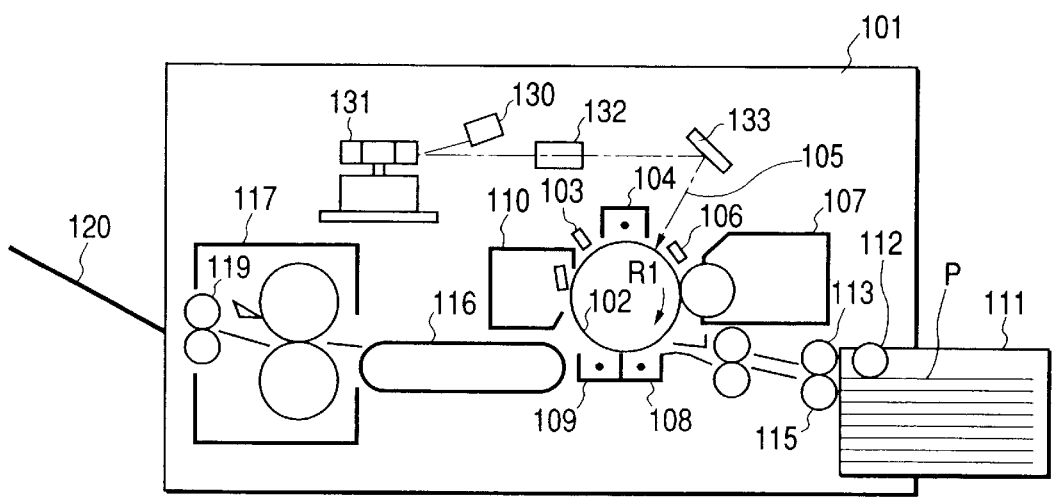
FIG. 8 is a schematic diagram showing a printer according to a second embodiment of the present invention.

FIG. 8 is a schematic diagram showing as a printer an image forming apparatus according to the second embodiment of the invention.

In this printer, substantially in the center of a main body 101 a cylindrical photosensitive drum 102 is provided as an electrophotographic photosensitive member. In the main body 101 the photosensitive drum 102 is supported so that it can be rotated in the direction indicated by an arrow R1. Provided around the photosensitive member 102 in the rotational direction are a charge elimination unit 103, such as a pre-exposure lamp, for eliminating the potential on the photosensitive drum 102; a primary electrification device 104, for uniformly electrifying the surface of the photosensitive drum 102; exposure means 105, for exposing the surface of the photosensitive drum 102 and forming an electrostatic latent image; a potential sensor 106, for measuring the surface potential of the photosensitive drum 102 after exposure; a developing device 107, as developing means for attaching toner to the electrostatic latent image and forming a toner image; a transfer electrification device 108, for transferring the toner image to a transfer material P; a separation electrification device 109, for separating the transfer material P from the photosensitive drum 102; and a cleaner 110, for removing residual toner from the photosensitive drum 102.

The transfer material P, to which the toner image is to be transferred, is supplied from a paper deck 111. This paper deck 111, for stacking the transfer materials P, is located below the photosensitive member 102, i.e., in the lower portion of the main body 101. The transfer material P in the paper deck 111 is supplied by a feed roller 112, and is fed via a carry roller 113 and a resist roller 115 to a gap between the photosensitive drum 102 and the transfer electrification device 108. The transfer material P is then transported along a carry belt 116 to a fixing unit 117. The toner image is fixed to the transfer material P by heat and pressure exerted by the fixing unit 117, and the transfer material P, bearing a final copy image, is discharged by discharge rollers 119 to a discharge tray 120.

In this copier, as the exposure means 105, a laser beam is emitted by a semiconductor laser 130 in accordance with an image signal, is scanned by a polygon mirror 131, and is guided via an imaging lens 132 and a reflection mirror 133 to the photosensitive drum 102.

Figure 9:
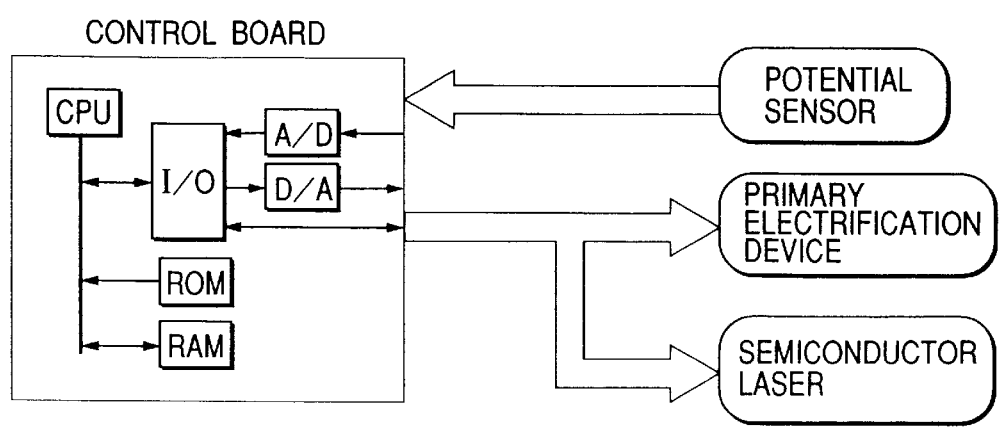
FIG. 9 is a diagram for explaining the electric arrangement in the vicinity of a control board according to the second embodiment.

FIG. 9 is a schematic diagram for explaining the electric arrangement in the vicinity of the control board that measures the potential on the photosensitive drum 102.

In FIG. 9, a ROM, in which a control program is stored, and a RAM, which is a temporary storage device for storing data required for the program, are connected to a CPU, which is the center processing device. Further, an I/O, which is an interface device, and an A/D converter and a D/A converter, which are data conversion devices, are connected to external periphery devices, and information is input to or output by the control board. As a peripheral device for this embodiment, a potential sensor can measure the potential on the photosensitive drum 102 after it has been electrified and exposed.

Further, the voltage to be applied to the primary electrification device 104 and the output value, which is a control value that is to be applied to the semiconductor laser 130, are controlled in order to form a desired dark portion potential and light portion potential on the photosensitive drum 102.

As in the first embodiment, the present inventor examined, relative to the target dark portion potential, the ratio of the output values L2 and L1 to be applied to the semiconductor laser 130. The output value L2 is employed for obtaining the second exposure amount E2 in order to acquire the second light portion potential VL2 used for image forming, and the output value L1 is employed for obtaining the first exposure amount E1 in order to acquire the first light portion potential VL1 used for adjustment.

Figure 10:
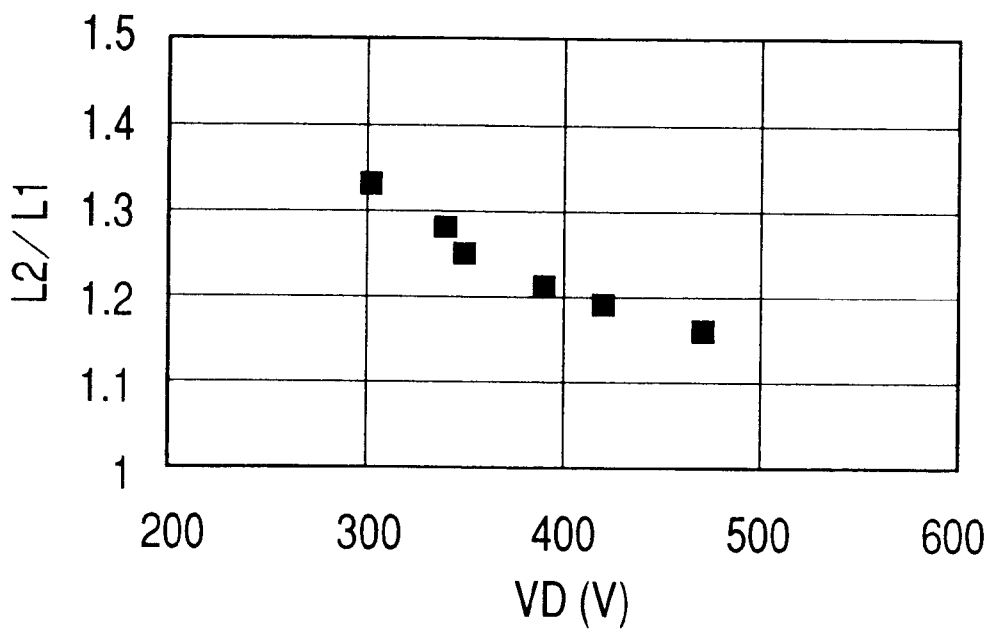
FIG. 10 is a graph of a ratio L2/L1 plotted relative to a dark portion potential VD according to the second embodiment.

FIG. 10 is a graph showing the ratio L2/L1, obtained by the examination of the second output value L2 and the first output value L1, that is plotted relative to the dark portion potential VD.

Figure 11:
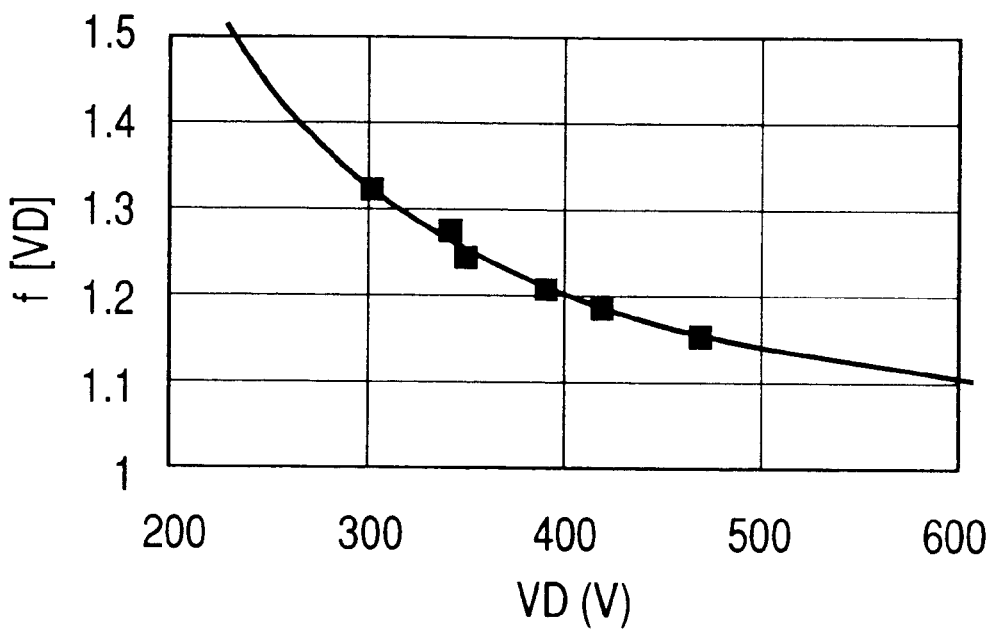
FIG. 11 is a graph for explaining a hyperbola f[VD] using the dark portion potential VD according to the second embodiment.

The ratio L2/L1 changes monotonously; it is not linear, but curved. When an approximation of a curve was prepared using the plots, as is shown in FIG. 11, the plots were substantially located along the approximate curve. When several functions were provided for the dark portion potential VD, a hyperbola was matched the most. In this embodiment, the second output value L2 calculated using the following expression.

$$L2 \equiv L1 \cdot f[VD] \qquad \text{second expression}$$

where $f[VD]=1581/((VD)^{1.5}-50^{1.5})+1$, and VD>50.

In this embodiment, each output value to be applied to the semiconductor laser 130 corresponds to each exposure amount on the photosensitive drum 102, and an approximately linear relationship is established. The calculation of the output value to be applied to the semiconductor laser 130 refers to the calculation of the exposure amount E2.

That is, the following expression may also be employed.

$$E2 \equiv E1 \cdot f[VD] \qquad \text{third expression}$$

where $f[VD]$ is the same as in the second expression, and VD>50.

Figure 12:
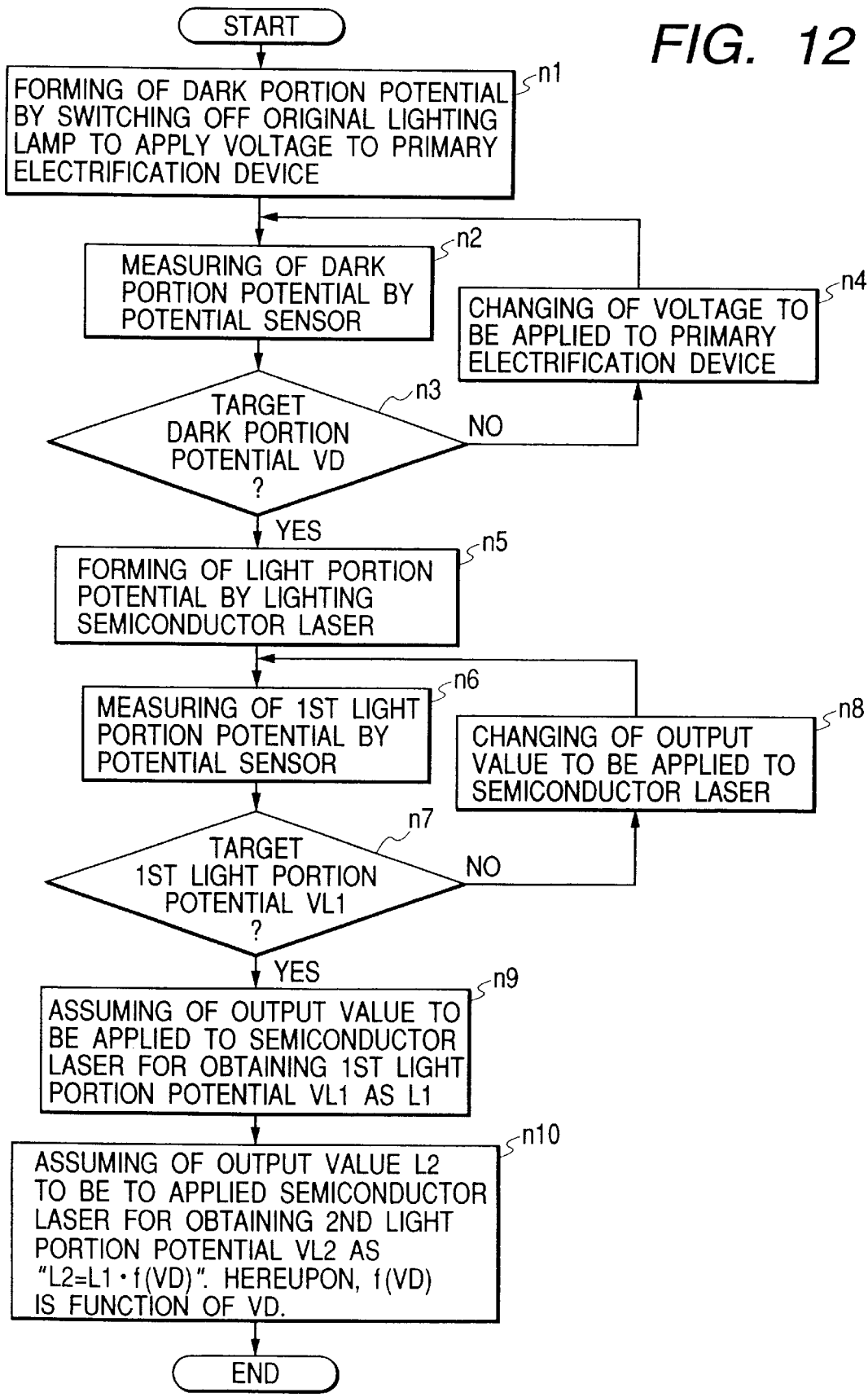
FIG. 12 is a flowchart for potential control according to the second embodiment.

FIG. 12 is a flowchart for the potential control provided for this embodiment.

First, the semiconductor laser 130 is turned off and a predetermined voltage is applied to the primary electrification device 104 to form the initial dark portion potential (n1). The initial applied voltage may be either a predetermined value or a previously adjusted voltage value. This dark portion potential is measured by the potential sensor 106, which is distant from the primary electrification device 104 (n2) and is located downstream of the photosensitive drum 102, and whether the target dark portion potential VD has been attained is determined (n3). When the potential does not fall within the range represented by VD±3 V, the voltage applied to the primary electrification device 104 is controlled (n4) so that the dark portion potential matches to the target dark portion potential VD.

The photosensitive drum 102 is electrified by applying the voltage for the primary electrification device 104 that is determined through the above sequence, and the semiconductor laser 130 is turned on to form the first light portion potential on the photosensitive drum 102 (n5). The output value to be applied to the semiconductor laser 130 may be either a predetermined value or an output value used at a previous control time. To ascertain whether the target light portion potential VL1 shown in FIG. 3 has been attained (n7), the light portion potential is measured by the potential sensor 106 (n6). When the light portion potential does not fall within the range represented by VL1±3 V, the output value applied to the semiconductor laser 130 is changed (n8), and the exposure amount is adjusted so that the light portion potential is reset to the target portion potential VL1. The output value applied to the semiconductor laser 130 at the thus adjusted first exposure amount E1 is defined as L1 (n9).

In this embodiment, the output value L2, which is to be applied to the semiconductor laser 130 in order to obtain the second exposure amount E2 used for image forming, is calculated using the second expression (n10). As is apparent from the second expression, the output value L2 is provided as the function of the dark portion potential VD. When the dark portion potential for image forming is formed by using the output value L2, the stable light portion potential VL2 can be obtained regardless of the dark portion potential VD, and the obtained image can be stabilized.

(Third Embodiment)

An explanation for a second embodiment will now be given while concentrating mainly on those portions that differ from the first and the second embodiments.

In the first and second embodiments, the function of the dark portion potential is employed to calculate the exposure amount E2, or the optical physical value P2 or L2 for obtaining the exposure amount E2. Although the coefficient differs, for the first and second embodiments the hyperbola function for the dark portion potential VD is employed as this function, whereas in this embodiment, another approximate curve is employed.

Figure 13A:
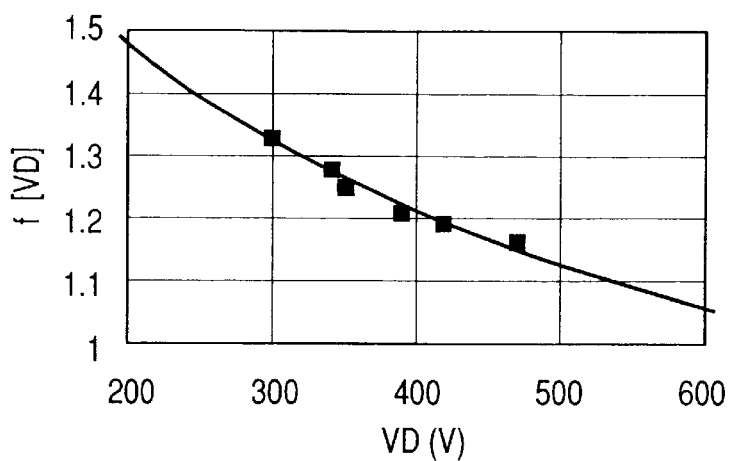
FIGS. 13A, 13B and 13C are graphs for explaining various functions using a dark portion potential according to a third embodiment of the present invention.
Figure 13B:
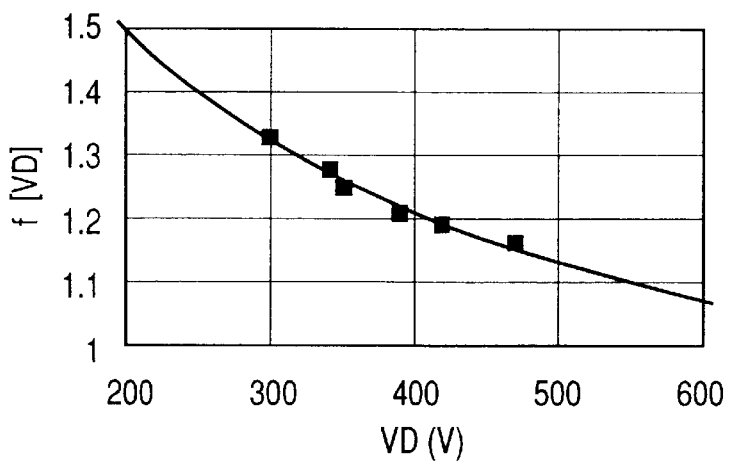
Figure 13C:
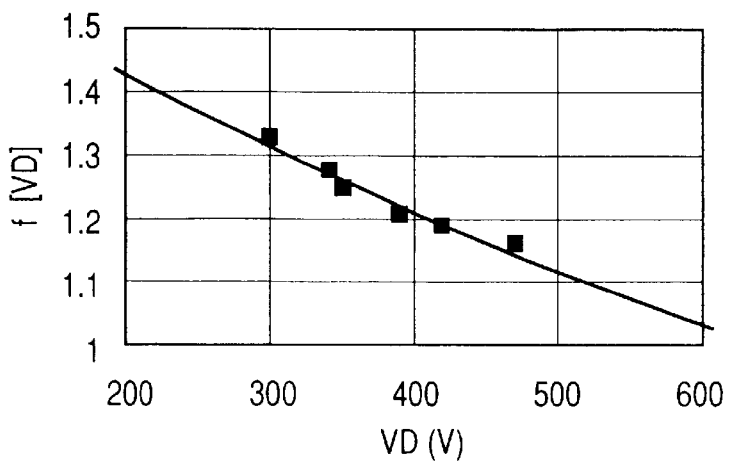

FIGS. 13A, 13B and 13C are graphs showing the results obtained when various approximate curves are employed. As in the second embodiment, the vertical axis represents the function f[VD]. As is apparent from the graphs, so long as the approximate curve changes monotonously, either the logarithmic curve in FIG. 13A, the power function in FIG. 13B or the exponential function in FIG. 13C can be employed for the calculation.

The following curves are employed as approximate curves.

Logarithmic function: $f[VD]=-0.3833 \cdot \ln[VD]+3.5078$ where ln is a natural logarithm.

Power function: $f[VD]=7.7119 \cdot (VD)^{-0.3091}$

Exponential function: $f[VD]=1.6754 \cdot e^{-0.0008 \cdot VD}$ (Fourth Embodiment)

An explanation for a second embodiment will now be given while concentrating mainly on those portions that differ from the first, the second and the third embodiments.

In this embodiment, an explanation will be given for an example wherein, when an approximate curve is monotonously changed across an entire area, even the n-order function can be employed so long as the function curve changes monotonously in the actual use area.

Figure 14A:
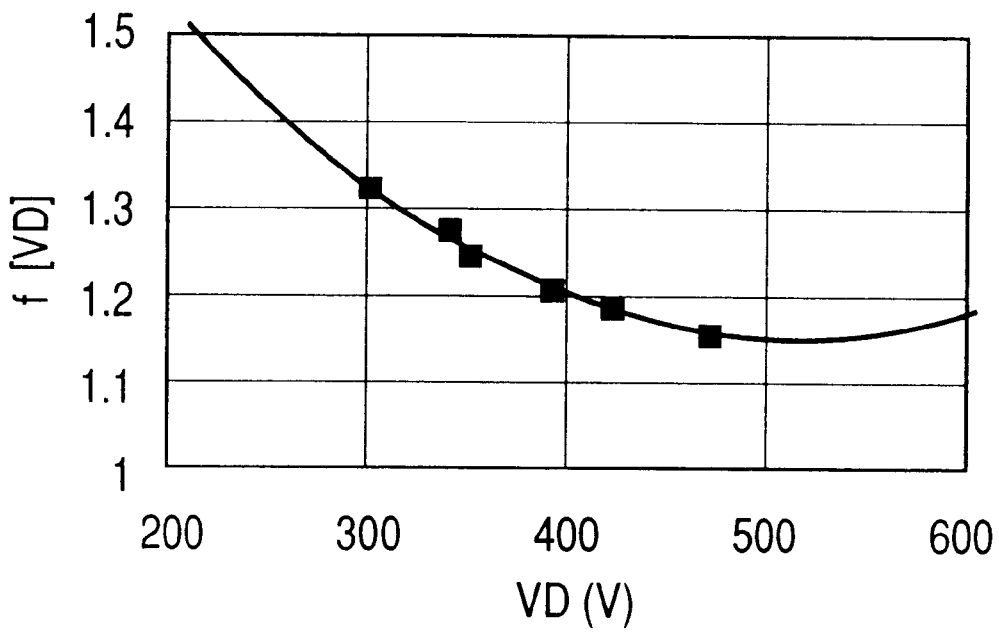
FIGS. 14A and 14B are graphs for explaining various functions using a dark portion potential according to a fourth embodiment of the present invention.
Figure 14B:
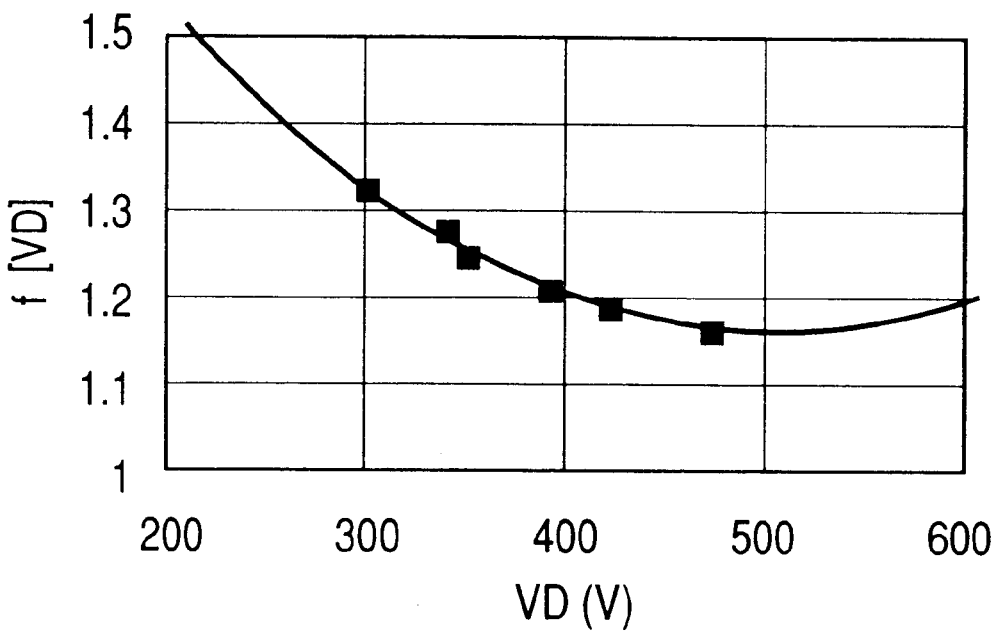

FIG. 14A is a graph showing the approximate curve of the quadratic function of the VD, and FIG. 14B is a graph showing the approximate curve of the cubic function of the VD. These curves reach minimum values at around a dark portion potential VD of 500 V, and are inclined toward the right when the VD is equal to or greater than 500 V. However, when the dark portion potential Vd of the image forming apparatus is not set higher than 500 V, it is apparent from the graph that either the quadratic function or the cubic function can be employed.

Therefore, in this embodiment, so long as in the actual use area of the dark portion potential VD the function changes monotonously as the VD is increased, an approximate curve can be obtained for the n-order function, such as the quadratic function or the cubic function. The following functions are employed as the approximate curves.

Quadratic function: $f[VD]=9\cdot10^{-10}\cdot(VD)^3+3\cdot10^{-6}\cdot(VD)^2-0.0036\cdot(VD)+21371$ Cubic function: $f[VD]=4\cdot10^{-6}\cdot(VD)^2-0.004\cdot(VD)+2.1846$ The coefficients for the functions of the dark portion potential VD used for the embodiment are merely examples. Optimal values need only be selected in accordance with the characteristic of the image forming apparatus, and the coefficients are not limited to those described here.

As is described above, the exposure amount E2 for obtaining the second light portion potential VL2 is obtained by using the product of the VD function and the exposure amount 1 to obtain the first light portion potential VL2, so that the accurate light portion potential VL2 can be formed and the optical image quality provided. The optical physical value for determining the exposure amount, e.g., the voltage P2 to be applied to the original lighting lamp, may be obtained using the product of the VD function and the voltage P1 to obtain the exposure amount E1.

As is described above, the stable light portion potential VL2 can be constantly obtained even for different dark portion potentials VD.

The invention can be employed not only for an analog exposure printer but also for a digital exposure printer. In this case, the output value L2 applied to the semiconductor layer can also be obtained by using the product of the function of the dark portion potential VD and the output value L1 to obtain the exposure amount E1.

Further, not only a hyperbola, but many other approximate curves that change monotonously can be employed for the function for the dark portion potential VD. So long as the curve changes monotonously only in the area of the actually used dark portion potential VD, the n-order function can also be employed.

As is described above, an image forming apparatus that can set multiple VDs does not require a large memory capacity in order to obtain the second light portion potential VL2, and can very easily and accurately perform potential control.

Therefore, even for different VDs, a stable image can be provided without deterioration of the image quality.

What is claimed is:

1. An electrophotographic apparatus comprising:
   a photosensitive member;
   electrostatic image forming means, for forming an electrostatic image on said photosensitive member, including electrification means for electrifying said photosensitive member and exposure means for exposing said photosensitive member;
   detection means, for detecting a surface potential on said photosensitive member;
   determination means, for employing the detection results obtained by said detection means to determine an electrification amount for said electrification means and an exposure control value for said exposure means, for determining said electrification amount for said electrification means, so that a dark portion potential on said photosensitive member is substantially a target dark portion potential selected from multiple target dark portion potentials, for determining a first exposure control value for said exposure means, so that a light portion potential, which is based on said determined electrification amount and which is formed on said photosensitive member by said electrification means and said exposure means, is substantially a first target light portion potential, and for determining, in accordance with said first exposure control value and said selected target dark portion potential, a second exposure control value for said exposure means, so that a light portion potential on said electrostatic image is substantially a second target light portion potential.

2. An electrophotographic apparatus according to claim 1, wherein said second exposure control value is determined in accordance with a product of said first exposure control value and a function that employs as a variable said selected target dark portion potential.

3. An electrophotographic apparatus according to claim 1, wherein said exposure control value is an exposure amount for said exposure means.

4. An electrophotographic apparatus according to claim 1, wherein based on an original image said exposure means exposes said photosensitive member.

5. An electrophotographic apparatus according to claim 1, wherein based on an image signal said exposure means exposes said photosensitive member.

6. An electrophotographic apparatus according to claim 1, wherein said exposure means includes a laser, and said exposure control value is an output value to be applied to said laser.

7. An electrophotographic apparatus according to claim 2, wherein said function is monotonously reduced as said selected target dark portion potential is increased.

8. An electrophotographic apparatus according to claim 2, wherein said function is a hyperbola.

9. An electrophotographic apparatus according to claim 1, wherein said second target light portion potential is smaller than said first target light portion potential.

10. An electrophotographic apparatus according to claim 1, wherein said second target light portion potential is constant, regardless of said multiple target dark portion potentials.

11. An electrophotographic apparatus according to claim 1, wherein a character mode for forming a character image and a photo mode for forming a photo image are available for selection, and wherein said target dark portion potential is selected in accordance with a selected mode.

* * * * *